US006632262B2

(12) United States Patent
Gabrielson

(10) Patent No.: US 6,632,262 B2
(45) Date of Patent: Oct. 14, 2003

(54) CONTROLLED RELEASE UREA-FORMALDEHYDE LIQUID FERTILIZER RESINS

(75) Inventor: Kurt D. Gabrielson, Lilburn, GA (US)

(73) Assignee: Georgia-Pacific Resins, Inc., Atlanta, GA (US)

( * ) Notice: Subject to any disclaimer, the term of this patent is extended or adjusted under 35 U.S.C. 154(b) by 115 days.

(21) Appl. No.: 09/923,794

(22) Filed: Aug. 8, 2001

(65) Prior Publication Data

US 2002/0043086 A1 Apr. 18, 2002

Related U.S. Application Data

(60) Provisional application No. 60/226,677, filed on Aug. 22, 2000.

(51) Int. Cl.[7] .................................................. C05C 9/02
(52) U.S. Cl. ............................ 71/30; 71/64.1; 71/64.11
(58) Field of Search ........................... 71/30, 64.1, 64.11

(56) References Cited

U.S. PATENT DOCUMENTS

| 3,096,168 A | 7/1963 | Waters et al. ................. 71/28 |
| 3,677,736 A | 7/1972 | Formaini ....................... 71/28 |
| 3,970,625 A | 7/1976 | Moore et al. ........... 260/29.4 R |
| 4,244,727 A | 1/1981 | Moore, Jr. ..................... 71/29 |
| 4,304,588 A | 12/1981 | Moore, Jr. ..................... 71/28 |
| 4,409,015 A | 10/1983 | Grace, Jr. ...................... 71/28 |
| RE31,801 E | 1/1985 | Moore, Jr. ..................... 71/29 |
| 4,526,606 A | 7/1985 | Formaini ....................... 71/3 |
| 4,554,005 A | 11/1985 | Hawkins ....................... 71/30 |
| 4,581,056 A | 4/1986 | Nooden et al. ................ 71/28 |
| 4,599,102 A | 7/1986 | Hawkins ....................... 71/30 |
| 4,778,510 A | * 10/1988 | Hawkins ....................... 71/30 |
| 5,266,097 A | * 11/1993 | Moore .......................... 71/28 |
| 5,449,394 A | 9/1995 | Moore .......................... 71/30 |
| 6,048,378 A | 4/2000 | Moore ...................... 71/64.01 |

FOREIGN PATENT DOCUMENTS

| EP | 0 290 103 | 11/1988 |
| GB | 2164929 A | 4/1986 |

* cited by examiner

*Primary Examiner*—Chhaya Sayala
(74) *Attorney, Agent, or Firm*—Banner & Witcoff, Ltd.

(57) ABSTRACT

A controlled release urea-formaldehyde liquid resin having a nitrogen level of at least 28 wt % and its method of manufacture. The controlled release urea-formaldehyde resin is useful as a fertilizer.

18 Claims, No Drawings

CONTROLLED RELEASE UREA-FORMALDEHYDE LIQUID FERTILIZER RESINS

This application claims priority to provisional U.S. Application Ser. No. 60/226,677, filed Aug. 22, 2000, which is hereby incorporated by reference in its entirety.

FIELD OF THE INVENTION

The invention relates to a controlled release urea-formaldehyde liquid fertilizer resin having a nitrogen level of at least about 28 wt % and a method of preparing the resin.

BACKGROUND OF THE INVENTION

Urea-formaldehyde based liquid fertilizers have been used for some time to provide nitrogen to the soil. In addition to nitrogen, phosphorous and potassium are considered major nutrients essential for plant growth. Over time, these major nutrients become deficient in the soil because plants use relatively large amounts of such nutrients. In addition to the major nutrients, secondary and micro-nutrients are also needed, but are usually deficient less often and are used in smaller amounts in fertilizer formulations. It is desirable to have a urea-formaldehyde base resin that contains the necessary nitrogen component, is stable, and capable of solubilizing different levels of phosphorus, potassium, and micro-nutrients from various sources while maintaining stability.

In the past, long term stability of high nitrogen (around 30%) liquid urea-formaldehyde fertilizers was achieved by forming either a high percentage (more than 30%) of cyclic triazone structures or by condensing the urea-formaldehyde resin into small urea-formaldehyde polymer chains.

Several patents issued to Hawkins describe the preparation of urea-formaldehyde resins having high triazone contents. U.S. Pat. No. 4,554,005 describes a reaction that produces at least about 30% triazone and has a preferred urea, formaldehyde, ammonia ratio of 1.2/1.0/0.28. Hawkins further describes preparing 30% nitrogen, liquid UF resin (containing 50% controlled release and 50% quick release nitrogen (50/50)) by starting with a 28% nitrogen liquid UF resin which is 70% controlled release and 30% quick release (70/30) and adding urea. There is only one (70/30) resin known in the industry which can be used to consistently produce a clear, storage-stable 50/50 resin containing 30% nitrogen by fortification with urea. This product is currently produced by Tessenderlo Kerley Inc. and marketed as N-SURE®.

U.S. Pat. No. 4,599,102 describes a reaction that produces at least about 30% triazone and has a urea, formaldehyde, ammonia ratio of 1.2/1.0/0.5. Both of these resins have a high percentage of ammonia. U.S. Pat. No. 4,776,879 describes a reaction that produces at least about 75% triazone in water insoluble forms. This material is then crystallized out and re-dissolved at low solids levels for use. U.S. Pat. No. 4,778,510 describes a reaction that produces at least about 48% triazone. The nitrogen is the useful part of the fertilizer to the plant and thus the higher the percentage of nitrogen, the more efficient the fertilizer.

Other patents describe condensing the resin into small chains. U.S. Pat. No. 4,781,749 to Moore reacts 1.5 to 2.5 mols formaldehyde per mole of urea in the presence of ammonium compounds such as ammonia. This initial mole ratio is below the initial mole ratio of 5 to 4 mols formaldehyde per mole of urea of the present invention. The pH is maintained at near neutral conditions (6.9–8.5) throughout the reaction. Condensed UF chains have lower solubility than methylolated ureas and could continue to advance, leading to extremely slow release.

U.S. Pat. No. 3,970,625 to Moore et al. describes a process for preparing urea-formaldehyde concentrates for use as slow release fertilizers or as adhesives. Urea and formaldehyde are mixed in a molar ratio of 1/4.4–7.3 with no more than 0.015 wt. % of ammonia present in the urea. The pH is adjusted to 8.8–9.5 and the mixture is heated to 50–60° C. for 30–60 minutes. Thereafter, water is removed by distillation under reduced pressure until solids comprise 60–90% of the remaining residue. For producing fertilizers, the residue is heated for another 48 hours at a temperature of 45–50° C.

U.S. Pat. No. 5,449,394 to Moore relates to liquid non-polymeric controlled-release nitrogen plant food compositions containing the condensation products of one part ammonia, two parts urea and three parts formaldehyde at a base buffered pH slightly above 7. The reaction is accomplished at a temperature of about 100° C. for 30–300 minutes. Water may be removed by evaporation until the nitrogen content of the formulation is between 20 and 30%. The solution is cooled before polymerization producing chains of more than 3 urea moieties can occur.

U.S. Pat. No. 3,677,736 to Formaini describes a process for manufacturing a liquid fertilizer suspension by preparing an aqueous mixture of urea and formaldehyde having a urea to formaldehyde ratio of 1–2:1 (F:U ratio of 0.5–1:1). Ammonia is then added in an amount of 0.3–6% by weight and the mixture is heated while maintaining the pH in the range of above 7. After heating, the resulting reaction product is diluted with water and an acidic material is added to adjust the pH to 1–4, then the solution is acidified and reheated. The pH is then adjusted to a pH of between 5 and 8.

It is desirable to make a stable urea-formaldehyde resin suitable for fertilizer use that uses significantly less triazone and no acid condensation, and has a higher nitrogen concentration than prior art resins. It is also desirable to have a resin that contains at least 50% controlled release nitrogen and will provide stable solutions with phosphate and potassium salts and other micro-nutrients.

BRIEF SUMMARY OF THE INVENTION

The invention is directed to a method of making a stable urea-formaldehyde resin suitable for fertilizer use which uses significantly less triazone than the Hawkins' process and no condensation reaction like the Moore processes, has a high nitrogen concentration, and yet is very stable, for instance, for at least two months at 25° C.

In particular, the invention is directed to a urea-formaldehyde liquid resin prepared by the method comprising:

1) combining formaldehyde, urea, and ammonia in a basic solution at a formaldehyde/urea/ammonia ratio of about 0.6–1/1/0.25–0.35;

2) heating the solution to about 80° C. to about 95° C., while maintaining a pH of at least 7 for at least 45 minutes;

3) cooling the solution to less than about 50° C., and adjusting the pH to about 9.0 to about 10.5;

wherein the nitrogen content of the resin is at least about 28 wt % based on 100% resin solids with about 50 to about 60 wt % of the nitrogen being controlled release and about 40 to about 50 wt % of the nitrogen being quick release.

The fertilizer resin exhibits superior miscibility with various phosphate, potassium, and micro-nutrient sources while maintaining water clarity and excellent storage stability.

DETAILED DESCRIPTION OF THE INVENTION

The invention is directed to a controlled release liquid urea-formaldehyde fertilizer prepared from a solution prepared by the reaction of formaldehyde, urea, and ammonia.

The nitrogen level of the urea-formaldehyde resin is at least about 28%, preferably at least about 30 wt %, and more preferably between about 30 and 32 wt %. The final mole ratio of formaldehyde:urea:ammonia is about 0.6–1:1:0.25–0.35. The nitrogen content is about 50 wt % to about 60 wt % controlled release, preferably about 55 to about 60 wt % and about 40 to about 50 wt % quick release, preferably about 40 wt % to about 45 wt %.

Quick release nitrogen refers to free urea. Controlled release nitrogen refers to substituted urea. Structure I below is a free urea and II–VII are each a substituted urea with IV–VII representing various triazones.

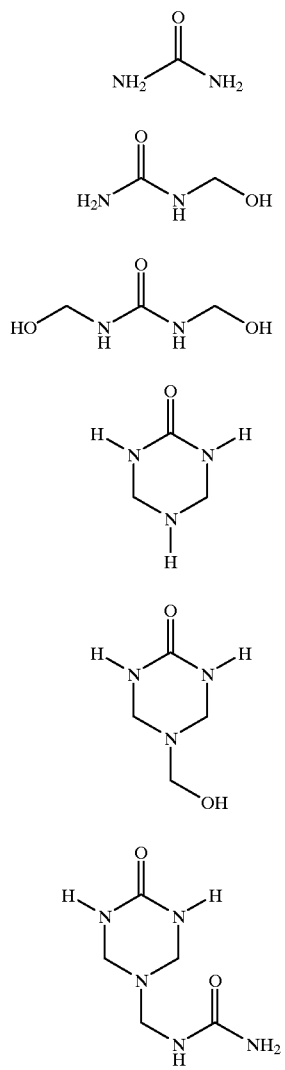

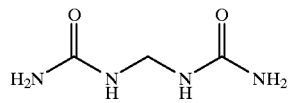

The fertilizer of the invention has the ability to solubilize varying concentrations of potassium and phosphate salts while maintaining excellent storage stability. The resin can be prepared in a reactor without isolation and eliminates the need for the end user to add or mix in urea. No acid condensation steps are required in the instant invention.

In accordance with the process of the invention:

Formaldehyde, urea, and ammonia are combined in a basic solution at a formaldehyde/urea/ammonia ratio of about 0.6–1/1/0.25–0.35, preferably about 0.7–0.9/1/0.25–0.3, and most preferably about 0.8/1/0.27. All or most of the water present comes from UFC and the ammonia source. Water may be added at the completion of the cook to adjust nitrogen content.

The solution is heated to about 80° C. to about 95° C., preferably about 85° C. to about 90° C., and held for at least about 45 minutes, preferably about 45 to about 120 minutes, more preferably about 60 to about 75 minutes, to ensure triazone formation and complete reaction of formaldehyde. Approximately 14 to 20% of the urea is in the form of triazone, preferably about 17 to about 20%. The pH level solution is at least 7, preferably about 7.5 to about 10.5, more preferably about 8.5 to about 9.5.

The solution is cooled to less than about 50° C., preferably about ambient temperature and the pH is adjusted to about 9 to about 10.5, preferably about 9.5 to about 10.

The process of the invention provides a urea-formaldehyde resin in which the triazone content, mono-, di-, and tri-substituted urea has been optimized for maximum stability and compatibility with producing stable blends with various phosphate and potassium salts and other micro-nutrients.

The pH may be maintained or adjusted by adding a compound, such as triethanolamine, borax, sodium or potassium bicarbonate, or sodium or potassium carbonate, preferably triethanolamine, at the start of the batch that will buffer the pH of the batch at the desired pH level. Alternatively, the pH may be maintained by addition of any suitable base during the reaction. While any base can be used to increase the pH of the reaction mix, preferably alkali metal hydroxides are used such as potassium hydroxide, lithium hydroxide, and sodium hydroxide.

Skilled practitioners recognize that the reactants are commercially available in many forms. Any form which can react with the other reactants and which does not introduce extraneous moieties deleterious to the desired reaction and reaction product can be used in the preparation of the urea-formaldehyde resin of the invention.

Formaldehyde is available in many forms. Paraform (solid, polymerized formaldehyde) and formalin solutions (aqueous solutions of formaldehyde, sometimes with methanol, in 37 percent, 44 percent, or 50 percent formaldehyde concentrations) are commonly used forms. Formaldehyde also is available as a gas. Any of these forms is suitable for use in the practice of the invention. Typically, formalin solutions are preferred as the formaldehyde source. In addition, formaldehyde may be substituted in part or in whole with substituted aldehydes such as acetaldehyde and or propylaldehyde. Glyoxal may also be used in place of formaldehyde as may other aldehydes not listed. It is to be recognized that the aldehyde is dissolved (solubilized) in water or other appropriate non-reactive organic of any desired or conventional nature, known in the art.

Similarly, urea is available in many forms. Solid urea, such as prill, and urea solutions, typically aqueous solutions, are commonly available. Further, urea may be combined with another moiety, most typically formaldehyde and urea-formaldehyde, often in aqueous solution. Any form of urea or urea in combination with formaldehyde is suitable for use in the practice of the invention. Both urea prill and combined urea-formaldehyde products are preferred, such as Urea Formaldehyde Concentrate or UFC 85. These types of products are disclosed in, for example, U.S. Pat. Nos. 5,362,842 and 5,389,716.

Commercially available aqueous formaldehyde and urea-containing solutions are preferred. Such solutions typically contain between about 60 and 25 percent formaldehyde and urea, respectively.

A solution having 35% ammonia can be used providing stability and control problems can be overcome. An aqueous solution containing about 28% ammonia is particularly preferred. Anhydrous ammonia may also be used.

In substitution in part or in whole, for the ammonia, any primary amine or substituted primary amine may be used such as methyl amine, monomethanol amine, amino propanol and the like. Further, difunctional amines may be used such as ethylene diamine or any combination of organic amines provided that one primary amine group is available to form the triazone ring. The reaction rates are much faster and more straight forward. Another reactant of interest is sodium sulfamate to make the cyclic urea sulfonate.

In a preferred embodiment of the invention, the urea-formaldehyde liquid fertilizer resins have a free urea content of 45–55 wt %, a cyclic urea content of 14–20 wt %, a monomethylol urea content of 25–35 wt % and a di/trimethylurea content of 5–15 wt % based on the urea-formaldehyde resin and, based on a 65–75 wt % urea solution, a free urea content of 31.5–38.5 wt %, a cyclic urea content of 9.8–14 wt %, a monomethylol urea content of 17.5–24.5 wt % and a di/trimethylurea content of 3.5–10.5 wt % wherein the rest of the solution is composed of water, ammonia, and formaldehyde.

The urea-formaldehyde liquid resin of the invention may then be used as a fertilizer. Other additives may be mixed into the liquid fertilizer prior to use such as any of a wide variety of well-known inorganic fertilizer nutrients based on phosphorous and potassium. Suitable nutrients may be obtained from K-Fol, 0–40–53, which is a solution containing 40% phosphate and 53% potassium. A suspension aid may be used such as a humate solution such as K-Tionic. K-Fol and K-Tionic are manufactured/distributed by GBS Biosciences, LLC. Edinburgh, Tex.

Pesticides may also be mixed in, e.g., to control weeds and kill insect larvae. Suitable additives are within the skill of the art.

The following examples are for purposes of illustration and are not intended to limit the scope of the claimed invention.

EXAMPLE 1

Urea and formaldehyde were reacted in the presence of 4.3% ammonia to produce a product having a pH above 7 and containing urea-formaldehyde in a mole ratio of 0.82 (F/U). UFC 85 is an urea-formaldehyde concentrate where 85% of the solution is urea and formaldehyde (25% and 60%, respectively) and 15% is water.

| Ingredient | Conc. % | Weight % | Moles |
|---|---|---|---|
| UFC 85 | 85 | 37.9 | |
| Formaldehyde (from UFC) | 100 | 22.7 | .76 |
| Urea (from UFC) | 100 | 9.5 | .16 |
| Ammonia | 28 | 15.4 | .25 |
| Urea | 100 | 46.7 | .78 |

| | Mole Ratio |
|---|---|
| U/F | 1.2 |
| F/U | 0.8 |
| F/A | 3.0 |
| U/A | 3.8 |
| A/U | 0.26 |

NMR results: 18% of urea is in the form of triazone, 8% of urea is in the form of di/tri-substituted urea, 30% of urea is in the form of mono-substituted urea, and 45% of urea is in the form of free urea.

The resin was synthesized at a pH of between 8.5 and 9.5 to eliminate the possibility of condensation and thus contain water-soluble chains. The mole ratio was optimized to produce the desired di-substituted, mono-substituted and triazone urea formation. The resin had a large amount of free urea in the solution that is soluble in the triazone formed early in the synthesis.

EXAMPLE 2

The following ingredients were combined by adding in the following order: UFC, first addition of ammonium hydroxide, first addition of urea, second addition of ammonium hydroxide, and second addition of urea. The combination was heated to 85° C. to 90° C. and held for 60 minutes. The pH was monitored every 15 minutes and adjusted as necessary to maintain a pH between 8.6 and 10 using 25% caustic.

| Ingredient | Concentration | Weight % |
|---|---|---|
| UFC, 85% | 85 | 37.9 |
| Ammonium hydroxide | 28 | 0.5 |
| Urea, prill | 100 | 28.4 |
| Ammonium hydroxide | 8 | 15.4 |
| Urea, prill | 100 | 18.3 |
| Caustic | 25 | to adjust pH |
| Formic Acid | 23 | to adjust pH |
| Water | | to adjust % N |

The combination was then cooled to 25° C. and analyzed for % nitrogen and % free urea (by $^{13}$C-NMR).

Results: % Nitrogen was 29.9; pH was 10.1;% Free urea was 50% which corresponds to <50% quick release. Blends exhibited excellent stability.

EXAMPLE 3

Urea and formaldehyde were reacted in the presence of 8.4% ammonia to produce a product having a pH above 7 and containing urea-formaldehyde in a mole ratio of 1.01 (F/U).

| Ingredient | Conc. % | Weight % | Moles |
|---|---|---|---|
| UFC 85 | 85 | 33.7 | |
| Formaldehyde (from UFC) | 100 | 20.2 | .67 |
| Urea (from UFC) | 100 | 8.4 | .14 |
| Ammonia | 28 | 30.0 | .49 |
| Urea | 100 | 31.5 | 1.05 |
| Water | | 3.7 | |

| | Mole Ratio |
|---|---|
| U/F | 1.0 |
| F/U | 1.0 |
| F/A | 1.38 |
| U/A | 1.36 |
| A/U | 0.74 |

NMR results: 15% of urea is in the form of triazone, 6% of urea is in the form of di/tri-substituted urea, 30% of urea is in the form of mono-substituted urea, and 49% of urea is in the form of free urea.

The resin was synthesized at a pH of between 8.5 and 9.5 to eliminate the possibility of condensation and thus contain water-soluble chains. The mole ratio was optimized to produce the desired di-substituted, mono-substituted and triazone urea formation.

The resin had a large amount of free urea in the solution that is soluble in the triazone formed early in the synthesis.

EXAMPLE 4

The following ingredients were combined by adding in the following order: UFC, first addition of urea, ammonia, and second addition of urea. The combination was heated to 85° C. to 90° C. and held for 60 minutes. The pH was monitored every 15 minutes and adjusted as necessary to maintain a pH between 8.5 and 10 using 25% NaOH.

| Ingredient | Concentration | Weight % |
|---|---|---|
| UFC, 85% | 85 | 33.9 |
| Urea | 100 | 13.0 |
| Ammonia | 28 | 30.0 |
| Urea | 100 | 18.5 |
| NaOH | 25 | to adjust pH |

The combination was then cooled to 25° C. and analyzed for % nitrogen and % free urea (by $^{13}$C-NMR).

Results: % Nitrogen was 30.1; pH was 9.8;% Free urea was 49% which corresponds to <50% quick release. Blends exhibited excellent stability.

EXAMPLE 5

The following blended samples were prepared resulting in an 18–4–6 fertilizer formulation where 18 is % Nitrogen, 4 is % Phosphate, and 6 is % Potassium.

| Sample | Grams Liquid UF Resin | Grams K-Tionic | Grams K-Fol 0-40-53 | Grams Water |
|---|---|---|---|---|
| 1 | 291 | 35 | 51 | 76 |
| 2 | 291 | 35 | 51 | 76 |
| 3 | 291 | 35 | 51 | 76 |
| 4 | 291 | 35 | 51 | 76 |
| 5 | 291 | 35 | 68 | 58 |

K-Tionic is a 25% humate solution and is a suspension aid for K-Fol. K-Fol 0–40–53 is a solution containing 40% phosphate and 53% potassium.

| Sample 1 | A urea-formaldehyde fertilizer resin containing 28% nitrogen where 70% of the nitrogen is controlled release and 30% of the nitrogen is quick release. |
|---|---|
| Sample 2 | A 30% nitrogen fertilizer prepared by adding urea at the end of Sample 1 |
| Sample 3 | Resin of Example 1 |
| Sample 4 | Resin of Example 3 |
| Sample 5 | Resin of Example 1 |

Samples 1 and 2 became very thick and precipitated during the blending process. Samples 3–5 remained fluid without precipitate for several weeks.

EXAMPLE 6

The following blended samples were prepared resulting in a 14-0-12 fertilizer formulation where 14 is % Nitrogen; 0 is % Phosphate; 12 is % Potassium. KTS is a potassium thiosulfate solution.

| Sample | Grams Liquid UF Resin | Grams KTS |
|---|---|---|
| 1 | 80 | 80 |
| 2 | 110 | 110 |
| 3 | 110 | 110 |
| 4 | 110 | 110 |

| Sample 1 | A urea-formaldehyde fertilizer resin containing 28% nitrogen where 70% of the nitrogen is controlled release and 30% of the nitrogen is quick release. |
|---|---|
| Sample 2 | Resin of Example 1 |
| Sample 3 | A 30% nitrogen fertilizer prepared by adding urea at the end of the resin of Sample 1 |
| Sample 4 | Resin of Example 3 |

Results: Samples 1 and 3 formed a gelled precipitate. Samples 2 and 4 formed stable, clear blends.

when the invention has been described with respect to specific examples including presently preferred modes of carrying out the invention, those skilled in the art will appreciate that there numerous variations and permutations of the above described systems and techniques that fall within the spirit and scope of the invention as set forth in the appended claims.

We claim:

1. A urea-formaldehyde resin prepared by the method comprising: combining formaldehyde, urea, and ammonia in a basic solution at a formaldehyde/urea/ammonia ratio of about 0.6–1.0/1/0.25–0.35;

heating the solution to about 85 to about 95° C., and holding while maintaining pH between about 7.5 and 10.5 for about 45 to 120 minutes;

cooling the solution to less than about 50° C., and adjusting the pH to about 9.5 to about 10.5;

wherein the nitrogen content of the resin is at least about 28 wt % based on 100% resin solids, the triazone content of the resin is 14 to 20 wt %, and about 50–60 wt % of the nitrogen is controlled release and about 40–50 wt % of the nitrogen is quick release.

2. The urea-formaldehyde liquid resin of claim 1 wherein the formaldehyde/urea/ammonia ratio is about 0.7–0.9/1/0.25–0.3.

3. The urea-formaldehyde liquid resin of claim 1 further comprising in 2) maintaining the pH at about 7.5 to about 10.5.

4. The urea-formaldehyde liquid resin of claim 3 further comprising in 2) maintaining the pH at about 8.5 to about 9.5.

5. The urea-formaldehyde liquid resin of claim 1 further comprising in 2) heating the solution to about 85 to about 90° C.

6. The urea-formaldehyde liquid resin of claim 1 further comprising in 2) holding the solution for about 45 to about 120 minutes.

7. The urea-formaldehyde liquid resin of claim 6 further comprising in 2) holding the solution for about 60 to about 75 minutes.

8. The urea-formaldehyde liquid resin of claim 1 wherein the nitrogen content of the resin is at least about 30 wt % based on 100% resin solids.

9. The urea-formaldehyde liquid resin of claim 1 further comprising at least one inorganic fertilizer nutrient selected from phosphorous, potassium, or both.

10. A method of producing a urea-formaldehyde liquid resin comprising:

1) combining formaldehyde, urea, and ammonia in a basic solution at a formaldehyde/urea/ammonia ratio of about 0.6–1/1/0.25–0.35;

2) heating the solution to about 80° C. to about 95° C., and holding while maintaining pH of at least 7 for at least 45 minutes; and 30 cooling the solution to less than about 50° C., and adjusting the pH to about 9.5 to about 10.5;

wherein the nitrogen content of the urea-formaldehyde resin is at least about 28 wt % based on 100% resin solids and about 50 wt % to about 60 wt % of the nitrogen is controlled release and about 40 wt % to about 50 wt % of the nitrogen is quick release.

11. the method of claim 10 wherein the formaldehyde/urea/ammonia ratio is about 0.7–0.9/1/0.25–0.3.

12. The method of claim 10 further comprising in 2) maintaining the pH at about 7.5 to about 10.5.

13. The method of claim 12 further comprising in 2) maintaining the pH at about 8.5 to about 9.5.

14. The method of claim 10 further comprising in 2) heating the solution to about 85 to about 90° C.

15. The method of claim 10 further comprising in 2) holding the solution for about 45 to about 120 minutes.

16. The method of claim 15 further comprising in 2) holding the solution for about 60 to about 75 minutes.

17. The method of claim 10 wherein the nitrogen content of the urea-formaldehyde liquid resin is at least about 30 wt % based on 100% resin solids.

18. The method of claim 10 further comprising adding at least one inorganic fertilizer nutrient selected from phosphorous, potassium, or both to the urea-formaldehyde liquid resin.

* * * * *

UNITED STATES PATENT AND TRADEMARK OFFICE
CERTIFICATE OF CORRECTION

PATENT NO.    : 6,632,262 B2
DATED         : October 14, 2003
INVENTOR(S)   : Kurt D. Gabrielson It is certified that error appears in the above-identified patent and that said Letters Patent is hereby corrected as shown below:

<u>Column 6,</u>
Line 50, "8" has been replaced with -- 28 --.

<u>Column 8,</u>
Line 56, "when" has been replaced with -- While --.

Signed and Sealed this

Ninth Day of December, 2003

JAMES E. ROGAN
*Director of the United States Patent and Trademark Office*